Nov. 29, 1938.  C. W. GEBHARDT  2,138,231
ELECTRIC TRANSMISSION
Filed Dec. 5, 1936  6 Sheets-Sheet 1
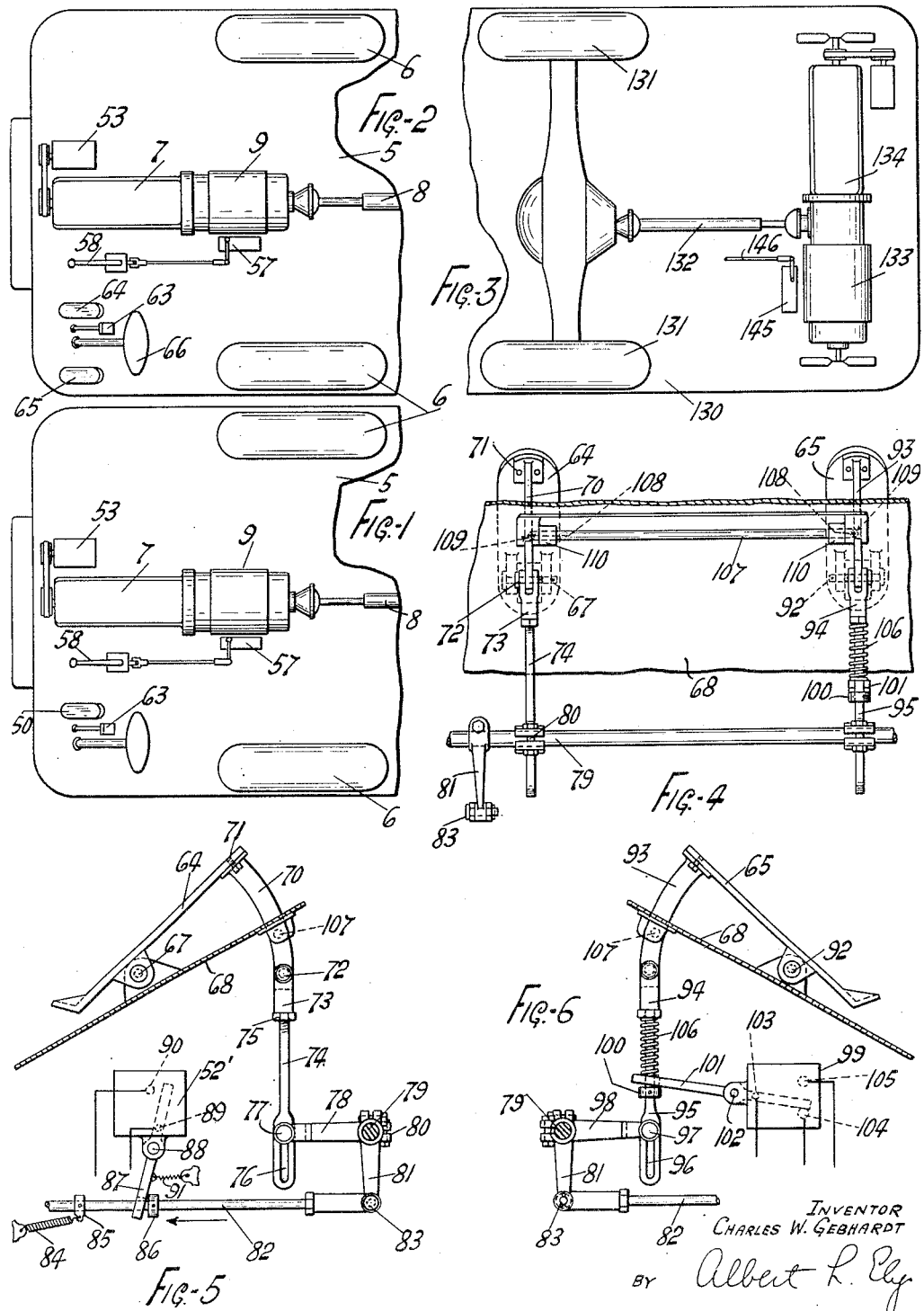
INVENTOR
CHARLES W. GEBHARDT
BY Albert R. Ely
ATTORNEY Nov. 29, 1938.  C. W. GEBHARDT  2,138,231
ELECTRIC TRANSMISSION
Filed Dec. 5, 1936  6 Sheets-Sheet 2
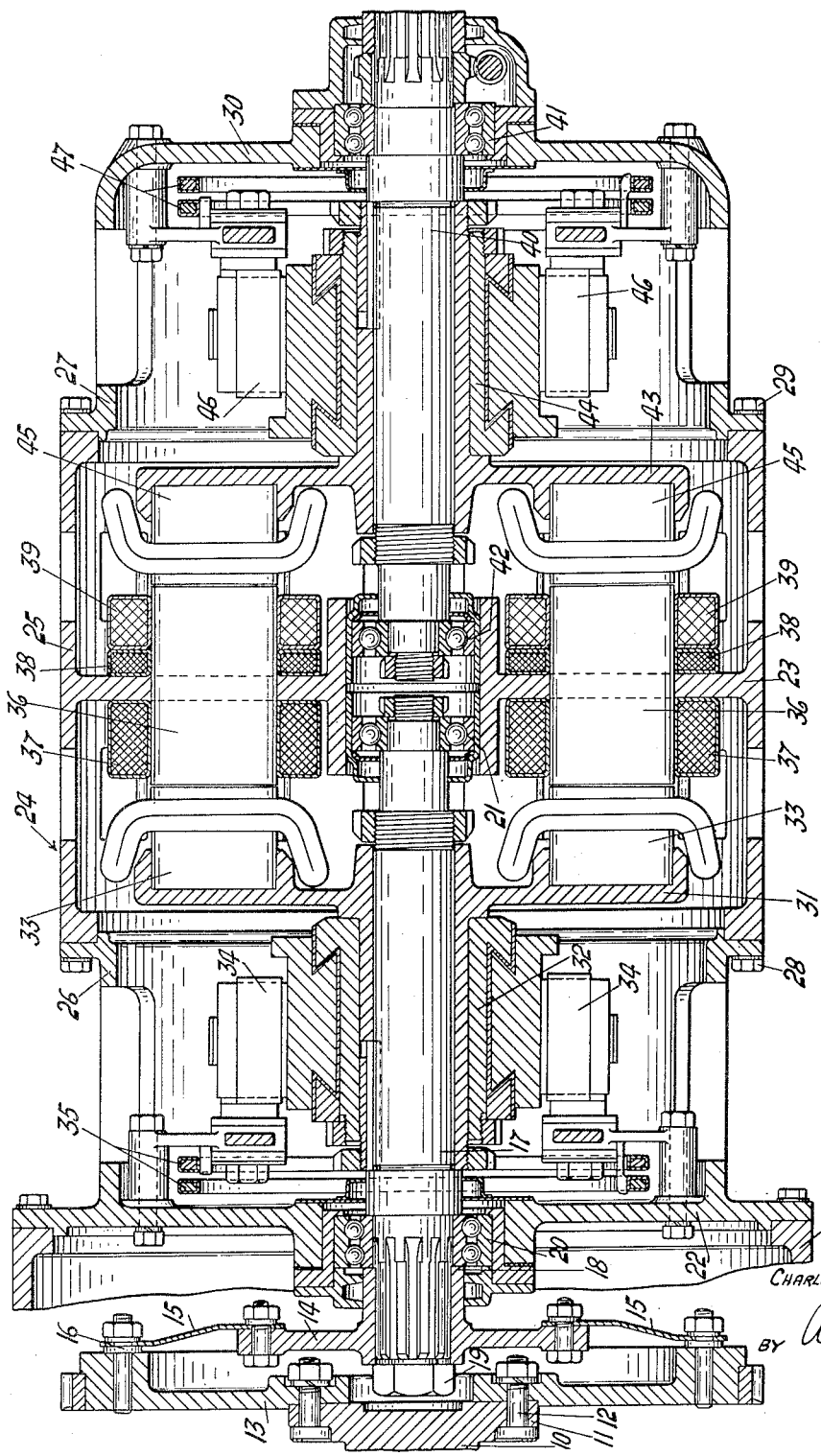
FIG. 7
INVENTOR
CHARLES W. GEBHARDT
BY 
ATTORNEY

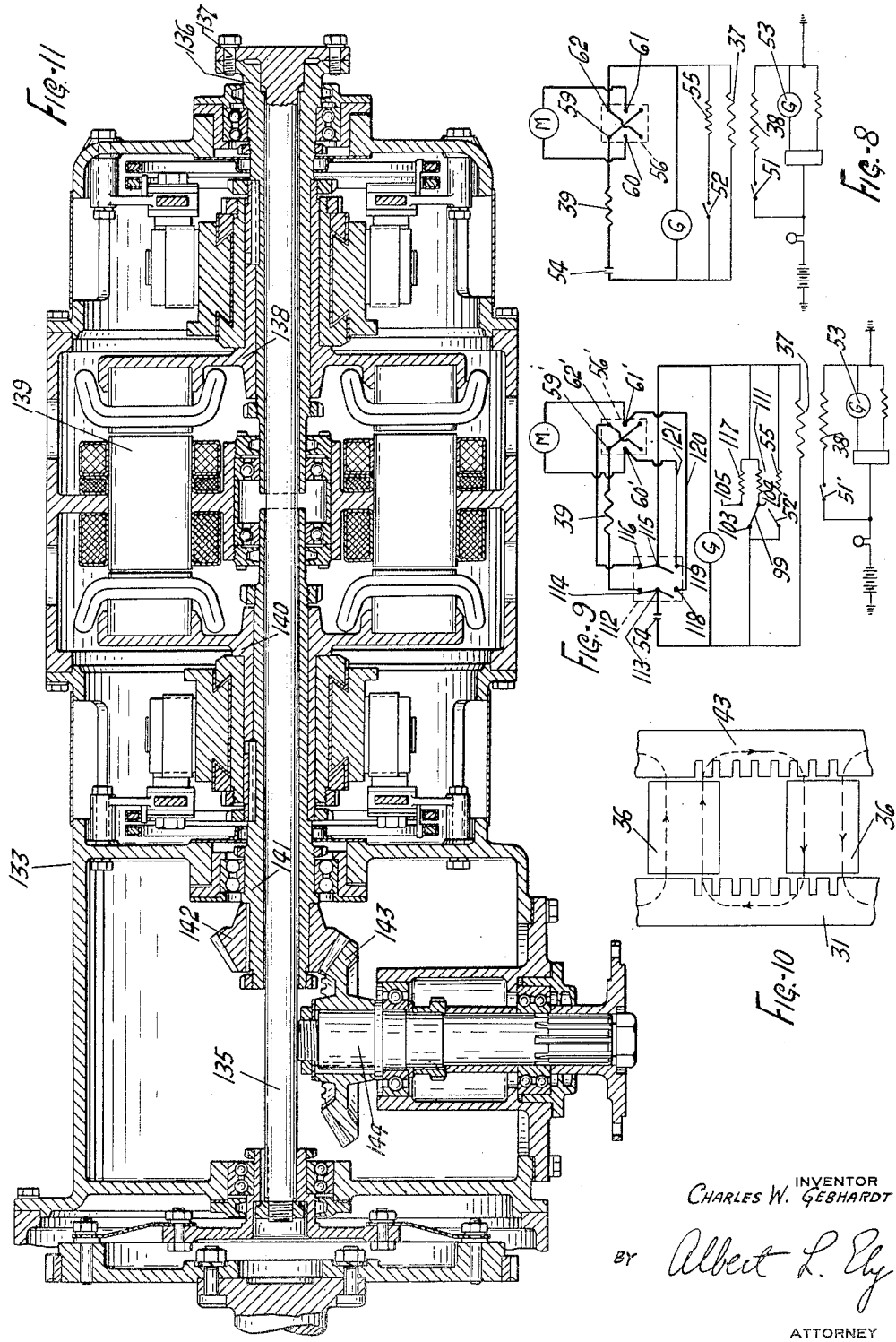

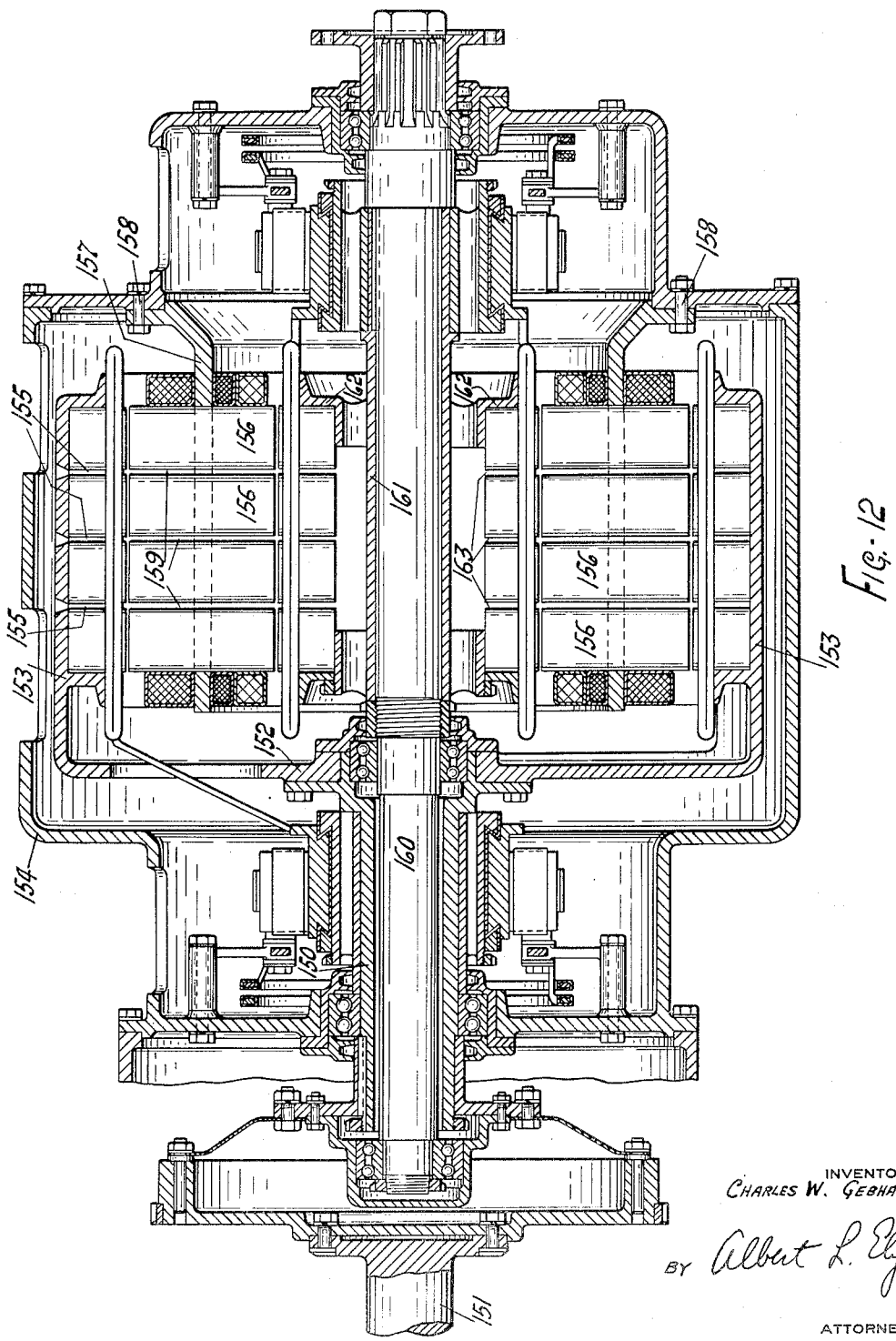

Nov. 29, 1938.         C. W. GEBHARDT         2,138,231
ELECTRIC TRANSMISSION
Filed Dec. 5, 1936        6 Sheets-Sheet 6

INVENTOR
CHARLES W. GEBHARDT
BY Albert L. Ely
ATTORNEY

Patented Nov. 29, 1938

2,138,231

UNITED STATES PATENT OFFICE 2,138,231

ELECTRIC TRANSMISSION

Charles W. Gebhardt, Kent, Ohio, assignor to Charles G. Gebhardt, San Francisco, Calif.

Application December 5, 1936, Serial No. 114,394

15 Claims. (Cl. 290—17)

This invention relates to electric transmissions and more particularly to the generation, control and transmission of electric energy for use in vehicles and the like. In general, the invention involves the use of a prime mover of any suitable type, a generator and a motor, all of which function to drive the wheels of a vehicle or the like.

It is an object of the invention to provide an electric transmission system having a combination generator and motor which may be carried in a single housing of comparatively light weight material whereby compactness and simplicity of construction and application as well as savings in weight are obtained.

Another object is to provide a combination generator and motor wherein a common field serves both the generator and motor, i. e. a set of field poles and coils ordinarily provided in constructions having separate generators and motors is entirely eliminated, which reduces iron and copper losses and results in a higher efficiency than can be obtained with a system having a separate generator and motor.

A further object is to provide a simple electric circuit and control mechanism that includes a manually operated lever control as well as a foot-pedal control which is mechanically interlocked with a dynamic brake whereby the latter and the foot-pedal control must be applied alternately.

Other objects and advantages will become apparent from the following description taken in conjunction with the accompanying drawings.

In the drawings,

Fig. 1 is a diagrammatic view of a portion of a vehicle showing my transmission in position therein;

Fig. 2 is a similar view with the dynamic brake pedal included;

Fig. 3 is a similar view of the rear portion of a vehicle showing a modified form of the invention positioned therein;

Fig. 4 is an enlarged detail view as it appears from the front of the vehicle of the accelerator and brake pedals showing the interlocking connection between same;

Fig. 5 is an enlarged detail view illustrating the operation of the accelerator pedal;

Fig. 6 is a similar view illustrating the operation of the brake pedal;

Fig. 7 is an enlarged transverse section, with parts in elevation, through one form of my electric transmission;

Fig. 8 is a wiring diagram omitting the dynamic braking feature;

Fig. 9 is a similar diagram with the dynamic braking feature included;

Fig. 10 is a diagrammatic view of the magnetic circuits;

Fig. 11 is a transverse sectional view, with parts in elevation, of another form of transmission;

Fig. 12 is a similar view embodying still another form of transmission;

Figure 13:
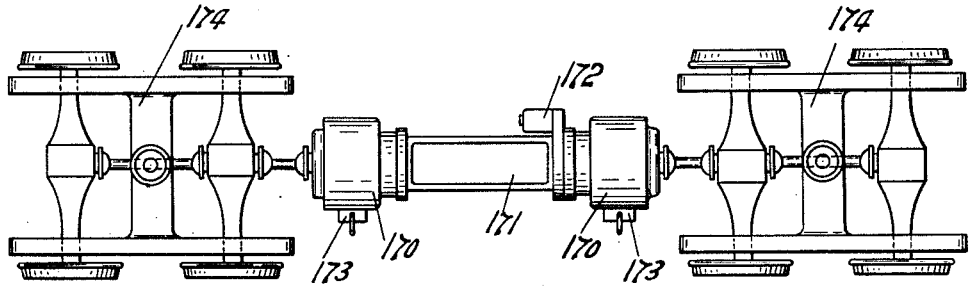
Fig. 13 is a diagrammatic view of a pair of transmissions installed in a railway vehicle.

Referring to Fig. 1 of the drawings, I have illustrated diagrammatically a portion of a vehicle 5, having front wheels 6, a prime mover 7, and drive shaft 8 leading to the rear wheels (not shown), with my electric transmission, indicated as a whole by the numeral 9, interposed between the drive shaft and prime mover.

Fig. 7 shows this transmission in detail and the numeral 10 indicates the crankshaft of prime mover 7 which may be an internal combustion engine, a Diesel engine, a steam engine, or any other device capable of transmitting rotary motion. Crankshaft 10 has a flange 11 that is secured by means of bolts 12 or the like to the hub of a flywheel 13. A spider-like coupling member is provided, having a hub 14 and a plurality of radially extending spring steel arms 15 which are connected at their outer ends, as at 16, to flywheel 13 adjacent the outer circumference of the latter. This coupling member is keyed or otherwise suitably secured on generator shaft 17, being held thereon between a shoulder 18 and a nut 19 threaded on the end of the shaft. Since no clutch is contemplated between the prime mover and shaft 17, it will be apparent that this shaft is designed to rotate whenever crankshaft 10 is being rotated by the prime mover.

Generator shaft 17 is suitably journaled in bearings 20 and 21 arranged respectively in one end wall 22 and partition wall 23 of a perforated annular housing designated as a whole by numeral 24. This housing preferably is formed of aluminum or other suitable light metal alloy and comprises a central portion 25 with which the partition wall 23 is preferably integrally formed, and end portions 26 and 27 bolted to the central portion as indicated at 28 and 29. End wall 30 is provided in portion 27. Preferably keyed to generator shaft 17, for rotation therewith, is an armature 31 carrying a commutator 32 and coils 33 in the conventional manner. Fastened to and insulated from the housing are the customary brushes 34 and collector rings 35.

The field poles 36 preferably consist of blocks of laminated iron extending in spaced relation radially through the partition wall 23 whereby a portion of the field is located on each side of this wall. Three field coils are placed on pole pieces 36, the shunt coil 37, exciter or tickler coil 38 and the series coil 39. The number of pairs of poles furnished and the windings of the coils depend upon the performance characteristics desired, as will be understood.

Also mounted in housing 24 is a motor shaft 40 which is journaled in suitable bearings 41 carried in end wall 30 and bearings 42 carried in the partition wall 23. As clearly shown in Fig. 7, the motor shaft 40 and generator shaft 17 are provided with suitable retainers and oil-seals. Motor shaft 40 has an armature 43 keyed thereon which carries a commutator 44 and coils 45, the arrangement being similar to that previously described in connection with the generator. Also, brushes 46 and collector rings 47 are provided, being carried by and insulated from the housing in any suitable manner. The outer end of shaft 40 is adapted to be connected in any satisfactory manner to the drive shaft 8 of the vehicle. Portions of a housing 48 have been shown secured to end wall 22 and this housing may be utilized to enclose the flywheel and crankshaft.

It will readily be apparent that the arrangement described provides a common field for the generator and motor. By combining the generator and motor in one unit and using a common set of field coils, I am eliminating a separate motor housing and a set of field coils which would ordinarily be necessary if a separate motor and generator were used. In addition to reducing iron and copper losses, my arrangement results in a higher efficiency than can be obtained with a system having a separate generator and motor.

Referring again to Fig. 1, I have shown the customary accelerator pedal 50 which is adapted to operate the throttle of the prime mover in the usual manner and in addition is adapted to close a pair of switches 51 and 52 included in the circuits illustrated diagrammatically in Fig. 8. The lower circuit, which is closed as soon as accelerator switch 51 is depressed sufficiently, is utilized for energizing the exciter coil and thus magnetizing the field poles. As shown, a separate generator 53 is used for this purpose, which preferably is of low voltage and which may be used for charging the storage battery and for taking care of the ignition and lighting system of the vehicle. This generator 53 may be driven from the prime mover 7 in the customary manner, as shown in Fig. 1. Of course, there is some residual magnetism in the field pole pieces, but I prefer to use the exciter circuit to add to this magnetism. The magnetic circuits, or the paths of the magnetic flux as it passes through the field pole pieces and the generator and motor armatures is illustrated diagrammatically in Fig. 10 by dot and dash lines. It should be noted that the flow through any pole piece is always in one direction, but the direction is changed in the next adjacent pole piece, whereby a plurality of magnetic circuits are provided, each circuit alternating in direction with respect to the adjacent circuit.

Since the generator shaft 17 is in driving connection with the prime mover, this shaft and the parts associated therewith will begin to rotate as soon as the prime mover is started. With the magnetic field established, rotation of the generator armature coils across this field will generate an electric current. This current is then permitted to flow through the motor armature coils, in the conventional manner, causing the motor armature shaft to rotate and furnish the mechanical energy required to drive the vehicle.

The electric circuit utilized in this transmission is diagrammatically shown in Fig. 8 and it will be observed that the accelerator switch 52 must be closed before current passes into the motor. The latter switch is closed substantially simultaneously with switch 51 when accelerator pedal 50 is depressed, and it will be apparent that until switch 52 is closed the prime mover may operate at idling speed without operating the motor. Even with switch 52 closed I desire to prevent immediate flow of current to the motor and to this end I place a magnetic breaker switch 54 in the circuit which is adapted to close automatically only when a predetermined voltage has been built up in a magnetic contact coil 55 arranged in the circuit, as clearly shown in Fig. 8. This arrangement provides an additional safeguard against operation of the motor at idling speed.

Coming now to the reverser switch, indicated as a whole by numeral 56, this switch controls the direction of the current through the electric motor whereby forward and rearward movement of the vehicle may be controlled. This switch is housed in a switch box 57 (Fig. 1) and is operated by a hand lever 58 under direction of the vehicle operator. When lever 58 is in its forward position contact is made between points 59, 60 and 61, 62, respectively, whereby current passes into the motor to drive the vehicle forwardly. In its rearward position, lever 58 makes contact between points 59, 61 and 60, 62, respectively, whereby the direction of the current through the motor will be reversed to drive the vehicle rearwardly.

The arrangement heretofore described will function satisfactorily in a vehicle equipped with the customary brakes of a mechanical or hydraulic nature operated by brake pedal 63 (Fig. 1) in the usual manner, but I prefer also to make use of dynamic braking as an additional safety and power saving feature in a vehicle using my transmission. Hence, in Fig. 9 I have shown a modified circuit adapted to permit dynamic braking and in Figs. 2, 4, 5 and 6, a mechanical means is shown for applying the brake by operating a foot pedal and for interlocking the brake pedal with the accelerator pedal so as to prevent either pedal from being operated while the other is in use.

Referring to Fig. 2, an accelerator pedal 64 and a dynamic brake pedal 65 are shown in their preferred location in the vehicle with respect to the steering wheel 66. As shown in Figs. 4 and 5, accelerator pedal 64 is pivoted at 67 to the floor board 68 and is adapted to be depressed in the customary manner. The upper end of pedal 64 has one end of an arcuate arm 70 rigidly secured thereto as at 71, said arm depending through a suitable slot in the floor board and being pivoted as at 72 to a clevis 73. The latter threadably receives the upper end of a lever 74 having a nut 75 thereon to adjust the length of this lever. The lower end of lever 74 is formed with an elongated slot 76 which receives a pin 77 carried on one end of an arm 78, the other end of the latter arm being tightly secured to a rotatable shaft 79 as shown at 80. This shaft 79 may be mounted for limited rotation in any suitable manner (not shown). Adjacent arm 78 an arm 81 is also tightly secured to shaft 79 and extended approximately at a right angle with respect to arm 78 whereby the action of arms 78 and 81 and shaft 79 is substantially that of a bell crank. One end of a throttle rod 82 is pivotally secured as at 83 to arm 81 and this rod is adapted to control the throttle of the prime mover in the ordinary manner when pedal 64 is actuated.

A spring 84 has one end secured to a collar 85 on rod 82 and the other end of this spring may be secured to any stationary part of the vehicle whereby it urges rod 82 in the direction of the arrow in Fig. 5 against the action of pedal 64 which urges the rod in the opposite direction when depressed. Rod 82 also has a collar 86 secured thereon which is adapted to engage the lower end of a switch arm 87 pivoted as at 88 to a stationary part of the vehicle, the upper portion of arm 87 being arranged to make and break contact between points 89 and 90 of switch 52'. This switch arm has a spring 91 connected thereto and to a stationary part of the vehicle whereby it will urge the switch arm into a position making contact between points 89 and 90. However, the action of spring 84 is sufficient to break this contact by holding the switch arm in the position shown in Fig. 5, which is the normal position, when pedal 64 is not depressed. As soon as the latter pedal is depressed rod 82 and collar 86 will move toward the right in Fig. 5 to control the opening of the throttle and spring 91 will urge the switch arm into contact making position. Also, as soon as the foot pedal is released spring 84 will return it to its original position.

Referring now to Figs. 4 and 6, pedal 65 is pivoted to the floor board as at 92 and has an arcuate arm 93 secured thereto, a clevis 94 being pivoted to the latter arm and a lever 95 being threadably received in the clevis. An elongated slot 96 is arranged in lever 95 to receive a pin 97 carried in one end of arm 98 tightly secured to shaft 79. Insofar as they have been referred to these parts associated with pedal 65 are identical with the similar parts associated with pedal 64, whereby when pedal 65 is depressed, arms 81 and 98 and shaft 79 have a bell-crank action which controls the throttle opening as well as the operation of switch arm 87 in the same manner as pedal 64. The advantages of this dual control of the throttle and switch arm 87 will subsequently be referred to.

In addition to the operations referred to pedal 65 is also adapted to operate a brake control switch 99. As shown in Fig. 6, lever 95 is provided above slot 96 with a collar 100 which is arranged to engage one end of a switch arm 101, pivoted to the vehicle as at 102. The opposite end of switch arm 101 is adapted to make contact between points 103 and 104 when in the position shown in Fig. 4, which is the normal position when no force is applied to pedal 65, and to be swung to a position making contact between points 103 and 105 when pedal 65 is depressed. A coil spring 106 is arranged on lever 95 to urge arm 101 into its proper position when pedal 65 is depressed and, of course, collar 100 will move arm 101 in the other direction when the latter pedal is released.

In order to prevent both pedals being depressed at the same time, I arrange a rod 107 (Fig. 4) between arms 70 and 93, which rod has tapered ends 108 adapted to be received in tapered openings 109 in each of arms 70 and 93. Rod 107 may be mounted for limited longitudinal movement in lugs 110 depending from the floor board, and is of sufficient length whereby when one end 108 is fully within its adjacent opening 109, the other end will be clear of its opening. With this arrangement, if pedal 64 is depressed, rod 107 will be moved longitudinally into locking position in arm 93 and as long as pedal 64 is depressed it will be impossible to depress pedal 65. Similarly, when the latter pedal is depressed, rod 107 will lock arm 70 against downward movement. The advantages of this interlocking arrangement will be later referred to.

In Fig. 9, the exciter circuit is identical with that previously described in Fig. 8, but the main circuit has been altered to take advantage of dynamic braking. It will be noted that points 103 and 104 are shown connected as they should be when pedal 65 is not depressed. With these points connected and with switches 52' and 54 closed, current is permitted to pass through a magnetic coil 111 to operate automatically a double acting magnetic switch 112 whereby contact is made between points 113, 114 and 115, 116. This permits current to pass through the series field 39 and through the motor in one direction. When the current passes through the reverser switch 56' in the direction referred to, contact will have been established between points 59', 60' and 61', 62' in the same manner as previously referred to in connection with switch 56 by operating hand lever 58. However, when pedal 65 is depressed and contact is made between points 103 and 105 of switch 99, coil 111 is cut out thus breaking the contacts referred to in magnetic switch 112. But current will now pass through magnetic coil 117 which is adapted to automatically operate switch 112 whereby contact is made between points 113, 118 and 115, 119. This operation of switch 112 cuts out the series field 39, thereby weakening the circuit, and permits current to pass from point 118 through conductor 120 to point 61' from where it passes through the motor in the reverse direction. Returning from the motor, current passes from point 60' through conductor 121 to point 119. It will be observed that in reversing the direction of the current by using the dynamic brake it is not necessary to break the contact between points 61', 62' and 59', 60' because contact has been broken at points 114 and 116 by cutting out coil 117. Hence, the hand lever 58 may be left in its forward position when the dynamic brake is used.

In bringing my vehicle to a stop it is preferred that the ordinary vehicle brakes be used, but if they should fail or other emergencies should arise, dynamic braking may be used. Probably the principal use of the dynamic brake will be made during descent of steep grades, it being possible to obtain substantially the same effect with the dynamic brake that is now obtained by shifting from a high speed to a lower speed in a gear transmission.

It is not desirable to permit the application of the dynamic brake while the accelerator pedal is depressed because the vehicle may be traveling at a high rate of speed and reversal of the motor at such speed might cause serious damage to the transmission. Hence, my interlocking arrangement makes it impossible to apply the dynamic brake while the accelerator pedal is depressed, thus making it necessary for the operator to release the accelerator pedal and temporarily break the electric connection to the motor at switch 52', and to consequently reduce the speed of the generator armature shaft due to movement of the throttle rod to idling position. Of course, it might be desirable to apply the dynamic brake when the vehicle is traveling at a rate of speed sufficiently low so that no damage would result from applying said brake with the accelerator pedal depressed, but in order to discourage carelessnesss on the part of the operator at high speed I prefer to make it impossible for him to use the dynamic brake at any speed without first releasing the accelerator pedal.

After release of the accelerator pedal and opening of switch 52' a vehicle in motion will continue in motion by its inertia. To reduce or to completely stop the vehicle motion I depress the dynamic brake pedal, which action closes switch 52' again and makes contact between points 103 and 105 of switch 99 whereby the series field will be cut out of the circuit and the direction of rotation of the motor reversed. Since the output of the motor is dependent upon the output of the generator and since the latter is controlled by the power received from the prime mover, it will be apparent that control of the prime mover throttle by the dynamic brake pedal becomes important because the speed of the prime mover may be varied by actuating this brake pedal, thus varying the speed of the motor in reverse and the braking force applied to the vehicle. By reducing the generator output through elimination of the series field with a consequent reduction of field magnetism, I prevent overloading of the electric current and obtain a more satisfactory braking control.

I will also be apparent that a vehicle at rest with the prime mover at idling speed may be moved backward by depressing the dynamic brake pedal, but it is not desirable to use this brake for this purpose because of the reduced generator output, due to elimination of the series field. The vehicle should be moved backwardly by first operating hand lever 58 to make contact between points 59', 61' and 60', 62' of switch 56'. Then the accelerator may be depressed and the current will pass reversely through the motor with the series field in the circuit. Elimination of the series field, therefore, tends to discourage use of the dynamic brake for backing the vehicle.

In some of the latest type busses there has been a tendency to mount the prime mover rearwardly of the rear wheels and my transmission may readily be adapted for use in such constructions. In Fig. 3 I have shown diagrammatically a portion of the rear end of a vehicle 130 having rear wheels 131 suitably driven through a drive shaft 132 which extends rearwardly into the wheels into driving engagement with the electric transmission 133 operated by prime mover 134. Referring now to Fig. 11, the electric transmission 133 is illustrated and it differs somewhat from the previous construction because it is necessary to convey power at a right angle to the motor armature shaft. In this modified construction shaft 135 is driven from the prime mover 134 in substantially the same manner as shaft 17, but shaft 135 extends completely through the housing and is connected at its end in driving engagement to a generator sleeve 136 by means of bolts 137 extending through adjacent flanges on the shaft and sleeve. Sleeve 136 may be mounted for rotation in suitable bearings as shown and has a generator armature 138 keyed thereto. Associated with armature 138 are all the elements necessary to constitute a generator and means for collecting and conducting the current and since these elements are identical with those described in the previous embodiment, they need not be referred to in detail.

This generator has a field similar to the field previously described and which will be indicated as a whole by numeral 139, which field is common to the motor armature 140. The latter armature is keyed to a rotatable sleeve 141 and has associated therewith all the elements necessary to constitute a motor which receives current from the generator. These motor elements are also identical with those previously enumerated and need not be referred to in detail. Motor sleeve 141 is journaled in suitable bearings as shown and has a bevel pinion 142 keyed thereon adjacent one end, said pinion meshing with a bevel gear 143 carried on a shaft 144 adapted to be arranged in driving engagement with drive shaft 132 to drive the vehicle, as will be understood.

It will be observed that the positions of the generator and motor in Fig. 11 have been reversed with respect to Fig. 7, in order to provide a satisfactory gear connection with the vehicle drive shaft, but this arrangement does not require any change in the circuits used and, accordingly, either the circuit in Fig. 8 or the dynamic brake circuit in Fig. 9 may be used therewith. With this modified embodiment of the invention the reversing switch box 145 (Fig. 3) is still preferably located adjacent the transmission housing and a rod 146 leads therefrom to the front of the vehicle for operation by the driver.

In Fig. 12 I have shown another modified embodiment of the transmission which also utilizes a common field for the generator and motor, but which has the latter elements arranged outwardly and inwardly respectively of the field instead of laterally as in the previous embodiments. As shown, the generator armature sleeve 150 is connected in driven engagement with the prime mover crankshaft 151 and carries an armature 152 having an annular portion 153 extending longitudinally of the annular housing 154 adjacent the inner surface of the latter. This armature has all the elements associated therewith necessary to generate and conduct electricity to the motor and since these elements have all been described in connection with Fig. 7, repetition of same is not necessary. Preferably in this form of the invention the generator armature is provided with radially extending air spaces 155 between the core pieces.

The field pole pieces 156 extend in spaced relation through an annular projection 157 secured to the housing as at 158 so that a portion of the field is located on each side of this projection. Three field coils of the type previously referred to in connection with Fig. 7 are carried on these pole pieces and they need not be referred to in detail. Again, the number of pairs of poles utilized and the windings of the coils depend upon the performance characteristics desired. Radially extending air spaces 159 preferably are provided between adjacent pole pieces.

Motor shaft 160 extends through sleeve 150 and is suitably journaled for rotation relative to said sleeve. The motor armature in this instance takes the form of a tube 161 rigidly secured on shaft 160 and having spider-like arms 162 extending radially of the tube to receive the core pieces and coils. The core pieces of the motor armature are also preferably separated by radially extending air spaces 163. Associated with the motor armature are all the elements necessary to receive current from the generator to energize the armature coils. Obviously, a common field for the generator and armature is also made use of in this form of the transmission and any of the circuits previously described may be utilized in a vehicle using this transmission.

In some constructions, such as rail cars and locomotives, it is desirable to use a plurality of transmission units and in Fig. 13 I have shown diagrammatically two transmission units 170 which preferably are of the type illustrated in Fig. 12 although the type shown in Fig. 7 could also be used. A prime mover 171 is adapted simultaneously to rotate the generator armature shafts of each transmission unit and an auxiliary generator 172 for exciting the fields of the units is operated by the prime mover in the usual manner. A reversing switch box 173 is arranged adjacent each transmission unit and it is preferred to operate both switches simultaneously by suitable connections (not shown). A wheel truck 174 has been shown on each side of the transmission units in position for the wheels thereof to be driven by these units and as shown, all the wheels are adapted to be driven through suitable connections at the center of the respective axles. Since the particular type of driving connection is immaterial as far as this application is concerned, no detailed description thereof is required.

Figure 15:
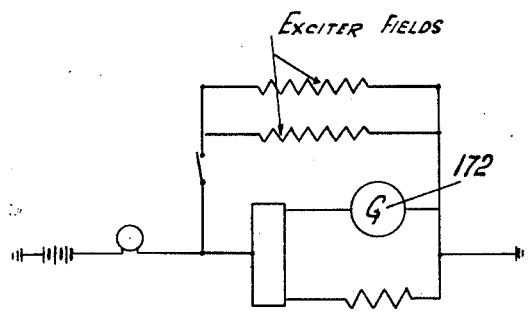
Fig. 15 is a wiring diagram for the exciter circuit when two transmissions are utilized.

Fig. 15 illustrates the exciter circuit which may be used with installations requiring two transmission units and it will be seen that this circuit merely adds to the previously described exciter circuit, the field of the second transmission unit.

Figure 16:
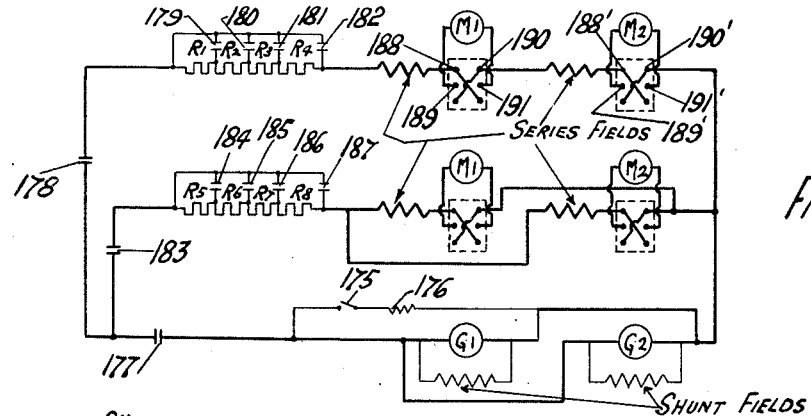
Fig. 16 is a wiring diagram for use when two transmissions are utilized.

Fig. 16 illustrates the preferred circuit for use with two transmissions and the generators of same are shown connected in parallel while the motors are first connected in series and subsequently changed to a parallel hook-up when higher speeds are desired. The circuit may be controlled by any suitable mechanism, but preferably the conventional controller (not shown) now in use on street railway cars is utilized. With this controller the operator first moves same to close switch 175 which passes current into a magnetic contact coil 176 adapted to automatically close a magnetic breaker switch 177 after a predetermined voltage has been built up in coil 176. The next movement of the controller closes the magnetic switch 178 and permits current to pass through the resistances $R^1$, $R^2$, $R^3$ and $R^4$ into the motors which are now arranged in series. To increase the speed of the vehicle these resistances are successively cut out and to this end the next movement of the controller closes magnetic switch 179 thereby cutting out resistance $R^1$. Similarly, each of the magnetic switches 180, 181 and 182 are closed in turn by the operation of the controller until no substantial resistance is offered to the flow of current through the motors. After these resistances have been cut out and it becomes desirable to increase the speed of the vehicle, the controller is next operated whereby switch 178 is opened and magnetic switch 183 is closed, thereby cutting out the series hook-up to the motors and bringing in the parallel hook-up with the current passing to the motors through resistance $R^5$, $R^6$, $R^7$ and $R^8$. To further increase the speed of the vehicle each of the latter resistances is successively cut out by successive movements of the controller which successively closes the magnetic switches 184, 185, 186 and 187 until the full speed of the vehicle is attained. To reduce the speed or cut off entirely the flow of current to the motors, the controller is merely returned toward its starting position and each switch controlled thereby is automatically opened at the necessary time until the initial position is reached when switch 175 is opened and no current can pass to the motors.

The reversing switches to control rearward movement of the vehicles are operated simultaneously in the same manner as previously described in connection with a single switch. When the vehicle is to move forward points 188 and 189 of one switch and points 188' and 189' of the second switch are simultaneously connected, while points 190, 191 and 190', 191' are similarly connected. To move the vehicle rearwardly points 188, 191 and 189, 190 of one switch and points 188', 191' as well as points 189', 190' of the second switch are connected.

Figure 14:
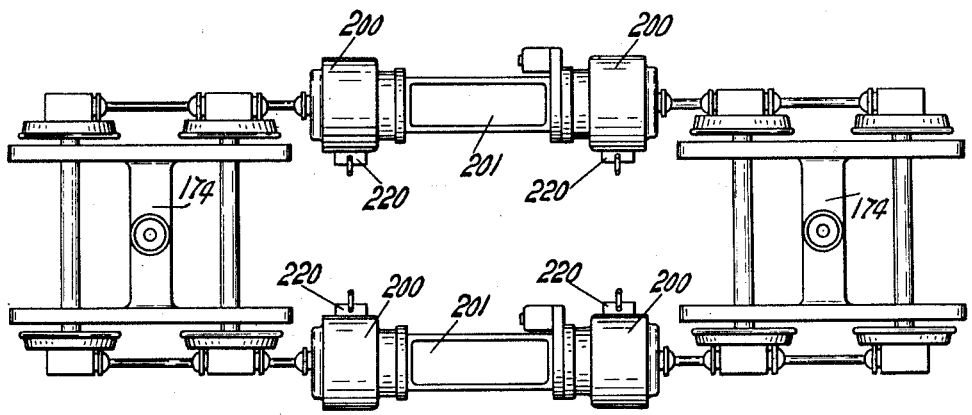
Fig. 14 is a similar view with four transmission units installed in a railway vehicle.

A further use of a plurality of transmission is illustrated diagrammatically in Fig. 14, wherein four transmission units 200 are operated by a pair of prime movers 201, one prime mover being used for each pair of transmissions, and the connections to the wheels of trucks 174 being made outwardly of the wheels whereby each wheel is driven. These driving connections to the wheels form no part of the present invention and accordingly need not be referred to in detail. Either of the transmissions of Figs. 7 and 12 may be utilized, but preferably that of Fig. 12.

Figure 17:
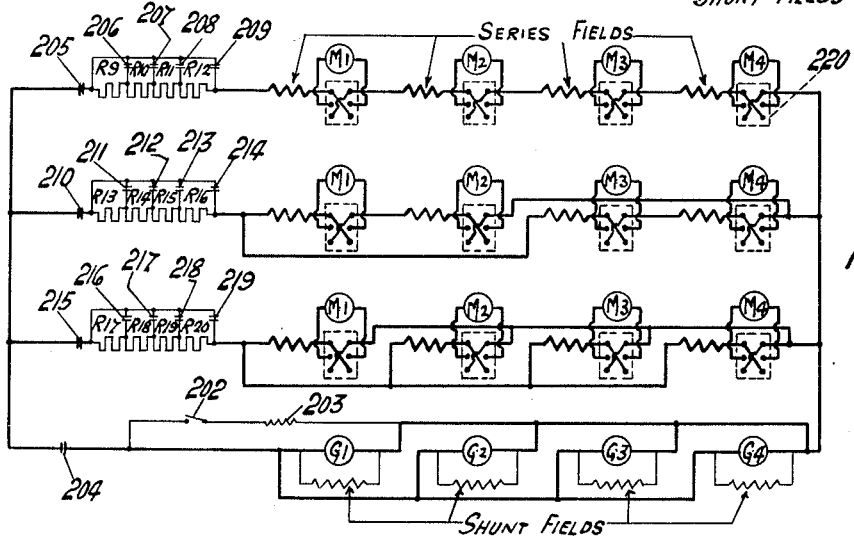
Fig. 17 is a similar diagram when four transmissions are utilized.

In Fig. 17 I have shown diagrammatically the preferred circuit for operating a vehicle having four transmission units and again the generators are connected in parallel. The motors, however, are adapted first to be connected in series, then in series parallel and finally in parallel. This circuit may also be controlled by the conventional street railway car controller (not shown) and the first movement thereof closes switch 202 which passes current into a magnetic contact coil 203 adapted to control automatically a magnetic breaker switch 204 after a predetermined voltage has been built up in this coil. Next, the movement of the controller closes magnetic switch 205 thus passing current through the resistances $R^9$, $R^{10}$, $R^{11}$ and $R^{12}$ into the motors which are now hooked up in series. To increase the speed of the vehicle each of these resistances is successively cut out by movements of the controller which successively closes the magnetic switches 206, 207, 208 and 209 until no substantial resistance affects the flow of current to the motors. To further increase the speed of the vehicle it is preferred not to pass immediately to a parallel motor hook-up, but first to go through a series parallel hook-up whereby the speed is increased gradually until the greatest speed is attained. Accordingly, the controller next closes magnetic switch 210 and opens switch 205 thereby cutting out the series hook-up and bringing in the series-parallel arrangement. Here again current passes through four resistance elements $R^{13}$, $R^{14}$, $R^{15}$ and $R^{16}$ which are successively cut out by closing magnetic switches 211, 212, 213 and 214 until no substantial resistance is offered to the current passing through the motors.

At this stage in the operation of the vehicle, the controller next closes magnetic switch 215 and opens switch 210, thus breaking the circuit to the series-parallel hook-up and bringing into the circuit the parallel motor hook-up. Once more the current passes through four resistance elements $R^{17}$, $R^{18}$, $R^{19}$ and $R^{20}$ which are successively cut out in the manner previously described by closing magnetic switches 216, 217, 218 and 219 until the full speed of the vehicle has been reached. Return movement of the controller will reduce the speed by reversing the operation of the switches and resistance elements, as will be understood. The reversing switches 220 are adapted to be operated simultaneously by any suitable mechanism (not shown) and since their operation is identical with the switches previously described no detailed description thereof is necessary. The number and arrangement of the resistance elements in Figs. 16 and 17 will be determined by operating conditions.

Figure 18:
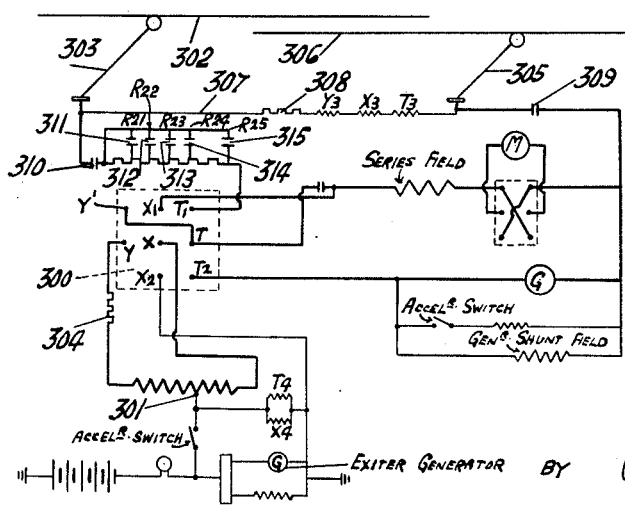
Fig. 18 is a wiring diagram for use in installations involving alternate use of a generator and overhead trolley line for operating the motor.

In some of the latest type busses provision has been made for furnishing power to the transmission motor from a prime mover at certain times and at other times from an overhead trolley line when the latter source is available. My transmission is readily adapted for use in vehicles of this type and in Fig. 18 I have shown diagrammatically a circuit suitable for use with a trolley line as well as a prime mover. In this figure numeral 300 indicates a magnetic transfer switch adapted to function so as to make the necessary contacts when either source of power is used. In this switch, when points X, $X^2$ and T, $T^2$ are connected and all other points are open, the motor is in circuit with the transmission generator (the latter being operated by the prime mover) and the circuit is identical with that shown in Fig. 8, being closed by the accelerator switch under control of the vehicle operator. The exciter circuit, however, differs somewhat from that shown in Fig. 8 in that a pair of magnetic contact coils $T^4$ and $X^4$ are arranged to automatically close points X, $X^2$ and T, $T^2$ of the transfer switch when the accelerator switch is closed. Also, the exciter field coil is larger than that previously used and only a portion thereof is utilized to magnetize the field poles, a suitable number of turns being tapped off for this purpose as indicated at 301. The purpose of this large field coil will be later referred to.

When the points Y, Y' and X, X' and T, T' are connected respectively in the transfer switch, with points $X^2$ and $T^2$ disconnected, the motor is adapted to receive power from the trolley line 302 through a suitable pole 303, the exciter generator as well as the transmission generator and its shunt field being cut out of the circuit. However, to compensate for the loss of the shunt field, the large exciter field coil becomes a series coil in the closed circuit and a fixed resistance element 304 may be added to the circuit between the series coil and point Y.

When it is desired to change from prime mover operation of the motor to trolley line operation, the accelerator switch is opened to break the circuit to the motor which operation disconnects points X, $X^2$ and T, $T^2$ of the transfer switch. The trolley pole 303 is then raised to contact wire 302 and pole 305 is raised to contact wire 306, whereby current will flow through conductor 307 between the two poles. The latter conductor includes a fixed resistance element 308 and three magnetic contact coils $Y^3$, $X^3$ and $T^3$ which are adapted automatically to close points Y, Y' and X, X' and T, T' respectively of the transfer switch. Adjacent pole 305 an overload magnetic breaker switch 309 is placed in the circuit and is normally closed by hand. However, it is adapted to be connected in series with a magnetic coil (not shown) in the conventional manner, whereby the switch is automatically opened when the circuit is overloaded.

A motor controller (not shown), similar to the customary trolley car controller is now adapted to be brought into operation and the first movement thereof automatically closes magnetic switch 310 to complete the circuit to the motor through resistance elements $R^{21}$, $R^{22}$, $R^{23}$, $R^{24}$ and $R^{25}$. The number and arrangement of these resistance elements will, of course, be determined by operating conditions. The speed of the vehicle is now increased by operating the controller to successively cut out the resistance elements by successively closing magnetic switches 311, 312, 313, 314 and 315 until no substantial resistance remains, at which time the full speed of the vehicle will be attained. Reversing the movement of the controller will, of course, reduce the speed of the vehicle and whenever it is desired to change to prime mover operation of the motor, lowering of the trolley wires will break the circuit, thus permitting the operator to close the accelerator switch and bring the transmission generator into operation. Since the reversing switch controlling backward movement of the vehicle is operated in the same manner as in Fig. 8, no description thereof is necessary.

It is believed to be apparent that I have provided a novel electric transmission which readily may be utilized in vehicles requiring this type of transmission, and that the invention is well adapted to perform the functions and to secure the advantages referred to.

While I have shown and described preferred embodiments of my invention it is to be understood that modifications thereof may be resorted to without departing from the spirit of the invention or from the scope of the subjoined claims.

What is claimed is:

1. An electric transmission comprising a generator and motor having a common field structure, a circuit for conducting electrical energy from the generator to the motor, mechanically operated means to close the circuit, mechanically operated means for reversing the direction of flow through the motor, and means for preventing operation of one of said mechanical means while the other is being operated.

2. An electric drive for vehicles comprising a combination generator and motor having a common field structure, a prime mover for operating the generator, a circuit for conducting electrical energy from the generator to the motor, a common means for closing said circuit and for operating said prime mover, and means for reversing the direction of flow through the motor, said last named means also operating said prime mover.

3. An electric drive for vehicles comprising a combination generator and motor having a common field structure, a prime mover for operating the generator, a circuit for conducting electrical energy from the generator to the motor, a common means for closing said circuit and for operating said prime mover, means for reversing the direction of flow through the motor, said last named means also operating said prime mover, and means preventing operation of said reversing means while said common means is being utilized.

4. An electric drive for vehicles comprising a combination generator and motor having a common field structure, a prime mover for operating the generator, a circuit for conducting electrical energy from the generator to the motor, an accelerator pedal for operating the prime mover and for closing the circuit, and a brake pedal for reversing the direction of flow through the motor, said brake pedal also operating said prime mover.

5. An electric drive for vehicles comprising a combination generator and motor having a common field structure, a prime mover for operating the generator, a circuit for conducting electrical energy from the generator to the motor, an accelerator pedal for operating the prime mover and for closing the circuit, a brake pedal for reversing the direction of flow through the motor, said brake pedal also operating said prime mover, and means interconnecting said pedals for preventing the operation of one of said pedals while the other is in use.

6. In an electric vehicle drive including a generator and a motor the sub-combination of an accelerator pedal for operating the motor in one direction and a brake pedal for operating the motor in the opposite direction, and means for preventing simultaneous operation of said pedals.

7. An electric drive for vehicles comprising a combination generator and motor having a common field structure and enclosed in a single housing, a partition wall or the like dividing said housing and supporting said field structure without constituting a part of the magnetic circuit, a prime mover for operating the generator, a circuit for conducting electrical energy from the generator to the motor, a common means for operating the prime mover and for closing a switch in the circuit, and a second switch in the circuit closed automatically only after the first mentioned switch has been closed.

8. In an electric drive for vehicles, a transmission unit comprising a combination generator and motor having a common field structure and enclosed in a single housing, a partition wall or the like dividing said housing and supporting said field structure without constituting a part of the magnetic circuit, a prime mover connected to the generator armature shaft and adapted to rotate the latter whenever the prime mover is being operated, a circuit for conducting electrical energy from the generator to the motor, means for operating the prime mover to rotate the generator armature shaft, and means in the circuit operable after a predetermined voltage has been built up by rotation of said shaft to close said circuit and allow the passage of curent to the motor.

9. An electric drive for vehicles comprising a pair of transmission units each including a generator and a motor having a common field structure, each unit being enclosed in a single housing, a partition wall or the like dividing each housing and supporting a field structure without constituting a part of the magnetic circuit, and each generator being operated from a common prime mover.

10. An electric drive for vehicles comprising two pairs of transmission units each unit including a generator and a motor having a common field structure, each unit being enclosed in a single housing, a partition wall or the like dividing each housing and supporting a field structure without constituting a part of the magnetic circuit, and a prime mover for each pair of generators.

11. An electric drive for vehicles comprising a transmission unit including a combination generator and motor having a common field structure and enclosed in a single housing, a partition wall or the like dividing said housing and supporting said field structure without constituting a part of the magnetic circuit, a prime mover for operating the generator, a circuit for conducting electrical energy from the generator to the motor, a second circuit adapted to conduct electrical energy to the motor from a trolley line, and means for closing either of said circuits alternately to operate the motor.

12. An electric drive for vehicles comprising a transmission unit including a generator and motor having a common field structure and enclosed in a single housing, a partition wall or the like dividing said housing and supporting said field structure without constituting a part of the magnetic circuit, a prime mover for operating the generator, an exciter circuit for magnetizing the field and including a coil a portion of which is cut out of said circuit, a circuit for conducting electrical energy from the generator to the motor, a second circuit adapted to conduct electrical energy to the motor from a trolley line, and means for alternately closing either of said circuits to the motor to operate the latter, said second circuit during use including the complete coil of the exciter circuit.

13. An electric transmission comprising a generator and motor having common field pole pieces and common field coils and enclosed in a single housing, a partition wall or the like dividing said housing and supporting said field pole pieces without constituting a part of the magnetic circuit.

14. An electric transmission comprising a generator and motor having common field pole pieces and common field coils including a series coil, a shunt coil and a tickler coil, all enclosed in a single housing, a partition wall or the like dividing said housing and supporting said field pole pieces without constituting a part of the magnetic circuit.

15. An electric transmission comprising a combination generator and motor having a common field structure and enclosed in a single housing, and a partition wall or the like dividing said housing and supporting said field structure without constituting a part of the magnetic circuit.

CHARLES W. GEBHARDT.